US012793618B2

(12) United States Patent
Zhou et al.

(10) Patent No.: US 12,793,618 B2
(45) Date of Patent: Nov. 10, 2026

(54) METHOD AND CIRCUIT FOR DATA TRANSMISSION BY PULLING A POWER LINE DOWN TO GROUND LINE

(71) Applicant: WUXI DECHIP MICRO-ELECTRONICS CO., LTD, Wuxi (CN)

(72) Inventors: Longjiang Zhou, Wuxi (CN); Xiancheng Zhang, Wuxi (CN)

(73) Assignee: WUXI DECHIP MICROELECTRONICS CO., LTD., Wuxi (CN)

( * ) Notice: Subject to any disclaimer, the term of this patent is extended or adjusted under 35 U.S.C. 154(b) by 0 days.

(21) Appl. No.: 19/092,378

(22) Filed: Mar. 27, 2025

(65) Prior Publication Data

US 2025/0225925 A1 Jul. 10, 2025

(30) Foreign Application Priority Data

Oct. 22, 2024 (CN) ........................ 202411476418.X

(51) Int. Cl.
*G09G 3/32* (2016.01)
*G09G 3/20* (2006.01)

(52) U.S. Cl.
CPC ............. *G09G 3/32* (2013.01); *G09G 3/2096* (2013.01); *G09G 2310/027* (2013.01); *G09G 2310/0294* (2013.01); *G09G 2370/08* (2013.01)

(58) Field of Classification Search
None
See application file for complete search history.

(56) References Cited

U.S. PATENT DOCUMENTS

| | | | | |
|---|---|---|---|---|
| 2007/0217451 A1 | 9/2007 | Chu et al. | | |
| 2009/0220025 A1 | 9/2009 | Saito et al. | | |
| 2016/0072658 A1 | 3/2016 | Mihota | | |
| 2016/0345627 A1* | 12/2016 | Liu | ......................... | A24F 40/95 |
| 2019/0305823 A1* | 10/2019 | Blaser | ...................... | H04B 1/40 |

* cited by examiner

*Primary Examiner* — Parul H Gupta
(74) *Attorney, Agent, or Firm* — Hemisphere Law, PLLC

(57) ABSTRACT

Provided are a method and a circuit for data transmission by pulling a power line down to a ground line. The method includes a step of obtaining a demodulated signal, and a step of obtaining a decoded step, thus controlling an LED (light-emitting diode). Data output and LED control are achieved by performing signal identification on a duration of a trigger level in the process of pulling the power line to the ground or pulling the power line up from the ground. Only a power line and a ground line are needed, and no additional signal line is required. The cost is low, the production and installation are convenient, the applicability is good, and chip integration of an LED driver circuit is facilitated.

8 Claims, 5 Drawing Sheets

METHOD AND CIRCUIT FOR DATA TRANSMISSION BY PULLING A POWER LINE DOWN TO GROUND LINE

TECHNICAL FIELD

The present disclosure relates to LED driving, and in particular to a method and a circuit for data transmission by pulling a power line down to a ground line.

BACKGROUND

With the rapid development of LED (Light-emitting Diode) lighting and display technology, the design and optimization of LED driving control has become a key link to enhance product competitiveness and reduce costs. Traditional LED driving control systems typically rely on independent signal lines to transmit control data for controlling LEDs, including functions such as brightness adjustment, color change, and dynamic display.

However, the use of additional signal lines significantly increases the material cost, and aggravates the complexity of system wiring, installation and later maintenance. Meanwhile, such a control way is not suitable for a scenario where only a two-line product with a power line and a ground line is available.

SUMMARY

To solve the defects in the prior art, the present disclosure provides a method and a circuit for data transmission by pulling a power line down to a ground line, thus solving the problems of increased cost, complicated wiring, installation and maintenance caused by the use of additional signals at present and inadaptability to two-line products.

To achieve the objective above, the present disclosure employs the following technical solution: a method for data transmission by pulling a power line to a ground line, including:

- demodulating a waveform signal on a power supply VCC to obtain a demodulated signal;
- decoding the demodulated signal according to a clock signal to obtain a decoded signal;
- and obtaining a control command according to the decoded signal and an address of an LED chip, where the control command is configured to control an LED.

Demodulating a waveform signal on a power supply VCC includes the following sub-steps:

- acquiring a first level signal and a second level signal according to a level state of the power supply VCC, inverting the first level signal to obtain a first inverted level signal, and obtaining the demodulated signal according to the first inverted level signal and the second level signal.

A power supply level is defined as VPWR, and a system ground level is defined as VGND, and a first turn-on voltage VT41, a second turn-on voltage VT42, a first trigger threshold V1 and a second trigger threshold V2 are acquired.

The power supply VCC is divided into two conditions: converting a voltage of the power supply VCC from VGND to VPWR, and the voltage of the power supply VCC from VPWR to VGND.

When the voltage of the power supply VCC is converted from VGND to VPWR, acquiring the first level signal specifically includes the following sub-steps: with the increase of VCC voltage, when VT41<VCC<V1, obtaining the first level signal at a high level, and inverting the first level signal to obtain the first inverted level signal at a low level; when V1<VCC, obtaining the first level signal at a low level, and inverting the first level signal to obtain the first inverted level at a high level; and acquiring the second level signal specifically comprises the following sub-steps: with the increase of the voltage of VCC, when VT42<VCC<V2, obtaining the second level signal at a high level, and when V2<VCC, obtaining the second level signal at a low level.

When the voltage of the power supply VCC is converted from VPWR to VGND, acquiring the first level signal specifically includes the following sub-steps: with the decrease of the voltage of VCC, when V1<VCC<VPWR, obtaining the first level signal at a low level, and inverting the first level signal to obtain the first inverted level signal at a high level; when VT41<VCC<V1, obtaining the first level signal at a high level, and inverting the first level signal to obtain the first inverted level at a low level; and acquiring the second level signal specifically comprises the following sub-steps: with the decrease of the voltage of VCC, when V2<VCC<VPWR, obtaining the second level signal at a low level, and when VT42<VCC<V2, obtaining the second level signal at a high level.

When the first level signal is at a high level, the first inverted level signal is at a low level, and the demodulated signal is at a low level at this time; and when the first level signal is at a low level, the first inverted level signal is at a high level, and a level state of the demodulated signal is determined by the second level signal.

When the second level signal is at a high level, the level state of the demodulated signal is determined by the first inverted level signal; and when the second level signal is at a low level and the first inverted level signal is at a high level, the demodulated signal is at a high level at this time.

The first trigger threshold V1 is less than the second trigger threshold V2, that is, V1<V2.

When the voltage of the power supply VCC is converted from VGND to VPWR, with the increase of the voltage of VCC:

- when VCC<V1, the first level signal is at a high level, the first inverted level signal is at a low level, and the demodulated signal is at a low level at this time;
- when V1<VCC<V2, the first level signal is at a low level, the first inverted level signal is at a high level, the second level signal is at a high level, and the demodulated signal is at a low level at this time; and
- when VCC>V2, the first level signal is at a low level, the first inverted level signal is at a high level, the second level signal is at a low level, and the demodulated signal is at a high level at this time.

When the voltage of the power supply VCC is converted from VPWR to VGND, with the decrease of the voltage of VCC:

- when V1<VCC<V2, the first level signal is at a low level, the first inverted level signal is at a high level, the second level signal is at a high level, and the demodulated signal is at a high level at this time; and
- when VCC<V1, the first level signal is at a high level, the first inverted level signal is at a low level, and the demodulated signal is at a low level at this time.

Decoding the demodulated according to a clock signal specifically includes the following sub-steps:

- recording a low level appearing in the demodulated signal as P code;
- acquiring and recording a duration of a high level in the demodulated signal as t, when t>Trst, recording a high level corresponding to the duration t as a reset code;

recording a first segment of high level which has a duration shorter than a duration of the reset code and appears after the reset code as a reference code, and recording the duration of a high level as Tref; when $$t < \frac{n+1}{2m} Tref,$$

recording a high level corresponding to the duration t as 0 code; when $$t > \frac{n+1}{2m} Tref,$$

recording a high level corresponding to the duration t as 1 code, wherein n and m are natural numbers greater than 1, and m>n;

acquiring a sequence consisting of 0 and 1 for each frame of data in the demodulated signal according to the reset code, the reference code, the 0 code and the 1 code, and taking the sequence as the decoded signal; and taking N data bits after the reference code in the sequence as command codes, taking remaining data bits after the command codes as data codes, wherein the data bits are 0 codes or 1 codes; and obtaining the control command according to the command codes and the data codes.

The method further includes:

determining a level state of the power supply VCC, when the power supply VCC is at a high level, controlling the power supply VCC to serve as an operation power supply to charge a digital power hold circuit; when the power supply VCC is at a low level, controlling the digital power hold circuit to serve as the operation power supply, with a requirement to ensure that time to pull the power supply VCC down to the level of the ground line is controlled to be shorter than time required for decreasing a voltage of the digital power hold circuit to a threshold level.

A circuit for data transmission by pulling a power line down to a ground line includes:

a power signal demodulation circuit, configured to demodulate a waveform signal on a power supply VCC and output a demodulated signal, where the demodulated signal is sent to a data protocol decoding circuit;

a bandgap reference circuit, configured to generate a reference voltage, where the reference voltage is sent to a voltage regulator circuit;

a digital power hold circuit, configured to generate a power supply required by a digital circuit for operation, charge the digital power hold circuit when a power supply VCC is at a high level, and supply power to a digital circuit when the power supply VCC is at a low level;

a chip ID storage circuit, configured to store an address of an LED chip of an LED driver circuit, and send the address to the data protocol decoding circuit for use;

a voltage regulator circuit, configured to convert a voltage of a power supply into a regulated voltage for internal use, and supply the regulated voltage to other circuits except a digital power supply;

an oscillator unit, configured to generate a clock signal to provide clock beats for the whole digital circuit operation;

a data protocol decoding circuit, configured to decode the demodulated signal according to the clock signal and the address of the LED chip to acquire a control command of an LED control system;

a logic control circuit, configured to generate corresponding display data according to a decoding command; and a digital data control circuit, configured to convert the display data into gray duty data for controlling brightness of an LED lamp, wherein the gray duty data is sent to the LED driver circuit for driving an LED.

The power signal demodulation circuit includes:

a first level trigger module, configured to output a first level signal;

a second level trigger module, configured to output a second level signal;

an inverter INV2, configured to invert the first level signal to obtain a first inverted level signal; and a flip-flop, configured to obtain a demodulated signal according to the first inverted level signal and the second level signal.

An output of the first level trigger module is connected to an input terminal of the inverter INV2, and an output of the inverter INV2 is connected to a R terminal of a RS flip-flop, and is used for zero clearing of an output terminal Q of the RS flip-flop, thus enabling the output terminal Q of the RS flip-flop to output a low level; an output of the second level trigger module is connected to an S terminal of the RS flip-flop, and configured to set the output terminal Q of the RS flip-flop, thus enabling the output terminal Q of the RS flip-flop to output a high level.

The first level trigger module includes a pull-up resistor R1, a transistor T1, a transistor T2, a transistor T3, a transistor T4, and an inverter INV1.

one terminal of the pull-up resistor R1 is connected to a power line, and the other terminal of the pull-up resistor R1 is connected to a drain of the transistor T1, a gate of the transistor T1 is connected to the power line, a source of the transistor T1 is connected to gate-drain of the transistor T2 to make the transistor T2 form an equivalent diode through a diode connection method of the transistor, and a source of the transistor T2 is grounded. Gates of the transistor T3 and the transistor T4 are connected together and then connected to the drain of the transistor T1 and one terminal of the pull-up resistor T1, drains of the transistor T3 and the transistor T4 are connected, and sources of the transistor T3 and the transistor T4 are respectively connected to the power supply and the ground to form an inverter structure. An output of the inverter is connected to an input terminal of the inverter INV1, and an output terminal of the inverter INV1 serves as an output of the first level trigger module.

Internal elements and topological connection relationships of the second level trigger module are the same as those of the first level trigger module.

The RS flip-flop includes an input NAND gate NAND1, an input NAND gate NAND2, and an inverter INV3.

One input terminal S of the input NAND gate NAND1 is connected to an output terminal of the second level trigger module, and the other terminal of the input NAND gate NAND1 is connected to an output terminal of the input NAND gate NAND2. One input terminal R of the input NAND gate NAND2 is connected to an output terminal of the inverter INV2, and the other terminal of the input NAND gate NAND2 is connected to an output terminal of the input NAND gate NAND1. An input terminal of the inverter INV3 is connected to an output terminal of the input NAND gate NAND2, and an output thereof serves as an output of the power signal demodulation circuit.

In conclusion, the present disclosure has the following beneficial effects:

The power line is configured for data transmission in a manner of pulling the power line down to the ground. Data output is achieved by performing signal identification on a duration of a trigger level in the process of pulling the power line to the ground or pulling the power line up from the ground. A data signal demodulated from the power line is sent into a decoding module for protocol decoding, thus achieving the control of an LED driver unit. A system requires only two lines, i.e., a power line and a ground line, and the control of the LED system can be achieved without an additional signal line, which is beneficial to reduce the cost, facilitate the production and installation, enhance the applicability of a product, as well as beneficial to chip integration of an LED driver circuit.

The present disclosure can reduce the cost: the material cost can be significantly reduced by reducing or eliminating the dependence on an independent signal line, this is because no additional cables and connectors are needed.

The present disclosure can simplify the system wiring: the complicated system wiring is avoided, making the production process of an LED driving control system simpler and more convenient.

The present disclosure is convenient for installation and maintenance: the system component is reduced, the complexity of installation is reduced, and the later maintenance and trouble removal are convenient.

The present disclosure is wide in applicability: the method is suitable for scenarios where only a two-line product with a power line and a ground line is available, and the adaptability and flexibility of the product are enhanced.

DETAILED DESCRIPTION OF THE EMBODIMENTS

The present disclosure is further described below with reference to accompanying drawings.

The specific embodiment is only an explanation of the present disclosure, rather than limiting the present disclosure. Those skilled in the art, after reading this specification, can make changes without creative contribution to the embodiment as needed, and all the modifications in the scope of the claims of the present disclosure are protected by the patent law.

In order to make the objectives, technical solutions and advantages of the present disclosure more clearly, an apparatus provided by the present disclosure is further described in detail below with reference to the accompanying drawings and specific embodiments. Advantage and features of the present disclosure will become more clearly from the follow description. It should be noted that the accompanying drawings are all depicted in extremely simplified forms and at inaccurate scales, and are only for the purpose of assisting to describe the embodiments of the present disclosure conveniently and clearly. To better illustrate the objectives, features, and advantages of the present disclosure, please refer to the accompanying drawings. It should be appreciated that the structures, proportions, sizes, and the like of the figures in the present disclosure are intended to be used in conjunction with the disclosure of the specification for those skilled in the art for understanding and reading, which are not intended to limit the conditions for implementing the present disclosure and therefore have no substantive technical significance. Any modifications to the structures, changes in proportional relationships, or adjustments in size shall still fall within the scope of the technical content disclosed by the present disclosure without affecting the efficacy and objectives achievable by the present disclosure.

EMBODIMENT

A method for data transmission by pulling a power line to a ground line is provided to cooperate with a circuit for data transmission by pulling a power line down to the ground line. The power line is pulled down to the ground for data transmission, thus achieving data transmission of a two-line product, and saving the cost of redundant signals of redundant lines.

Figure 1:
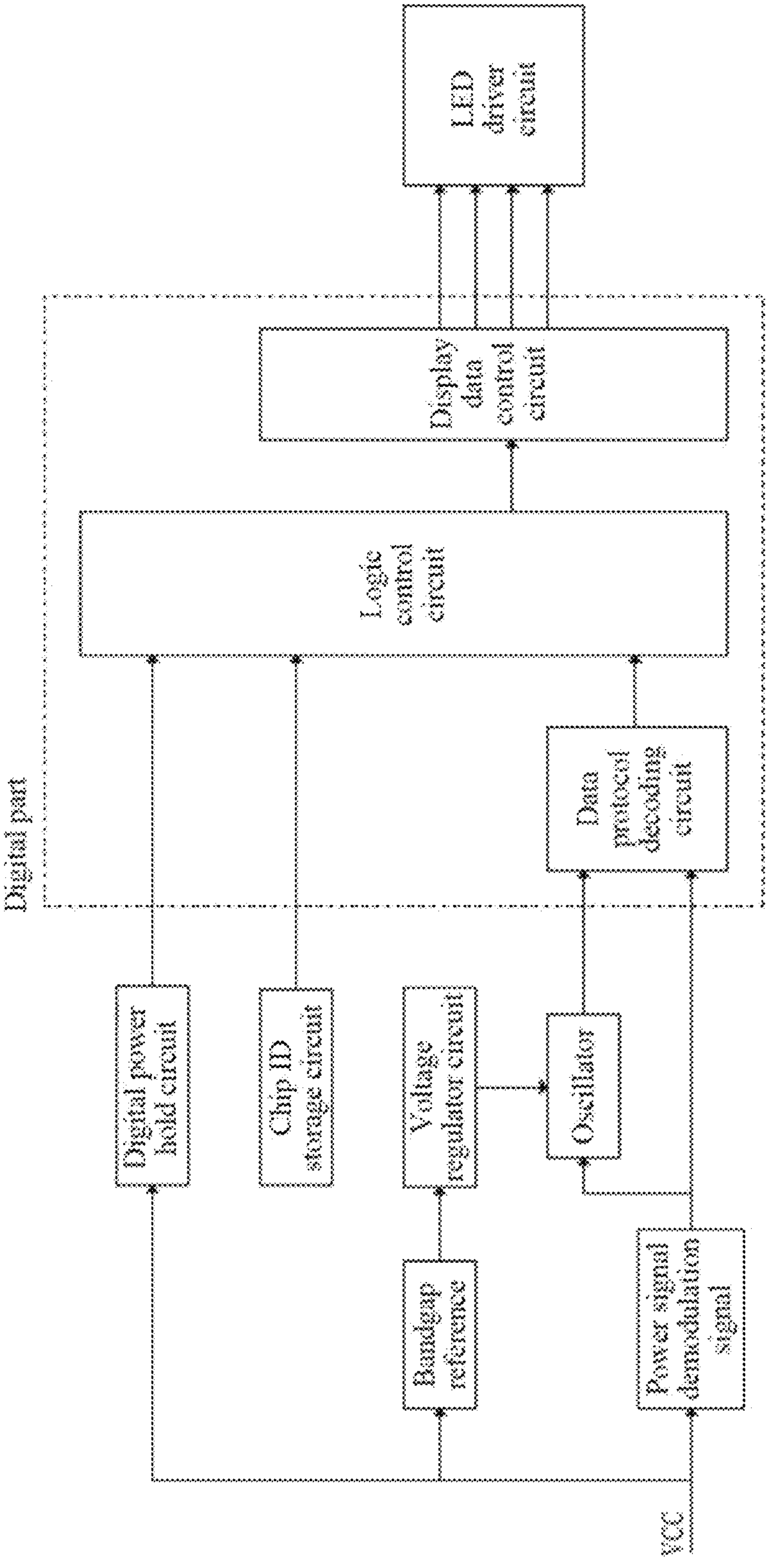
FIG. 1 is a diagram of a circuit function module according to the present disclosure.

To describe the circuit for data transmission by pulling a power line down to the ground line better, the circuit for data transmission by pulling a power line down to the ground line is further described here:

A circuit for data transmission by pulling a power line down to the ground line, as shown in FIG. 1, includes:

(1) a power signal demodulation circuit, configured to demodulate a waveform signal on a power supply VCC and output a demodulated signal, wherein the demodulated signal is sent to a data protocol decoding circuit;

(2) a bandgap reference circuit, configured to generate a reference voltage, where the reference voltage is sent to a voltage regulator circuit;

(3) a digital power hold circuit, configured to generate a power supply required by a digital circuit for operation, charge the digital power hold circuit when a power supply VCC is at a high level, and supply power to a digital circuit when the power supply VCC is at a low level;

(4) a chip ID storage circuit, configured to store an LED chip address of an LED driver circuit, and send the address to the data protocol decoding circuit for use;

(5) a voltage regulator circuit, configured to convert a voltage of a power supply into a regulated voltage for internal use, and supply the regulated voltage to other circuits except a digital power supply;

(6) an oscillator unit, configured to generate a clock signal to provide clock beats for the whole digital circuit operation;

(7) a data protocol decoding circuit, configured to decode the demodulated signal according to the clock signal and the LED chip address to acquire a control command of an LED control system, where the data protocol decoding circuit is configured to decode an input demodulated signal according to the clock signal provided by the oscillator, and then determine whether to execute a command in a data frame according to an ID provided by the chip ID storage circuit based on the decoded information;

(8) a logic control circuit, configured to generate corresponding display data according to a decoding command; and (9) a digital data control circuit, configured to convert the display data into gray duty data for controlling brightness of an LED lamp, where the gray duty data is sent to the LED driver circuit for driving an LED.

Figure 2:
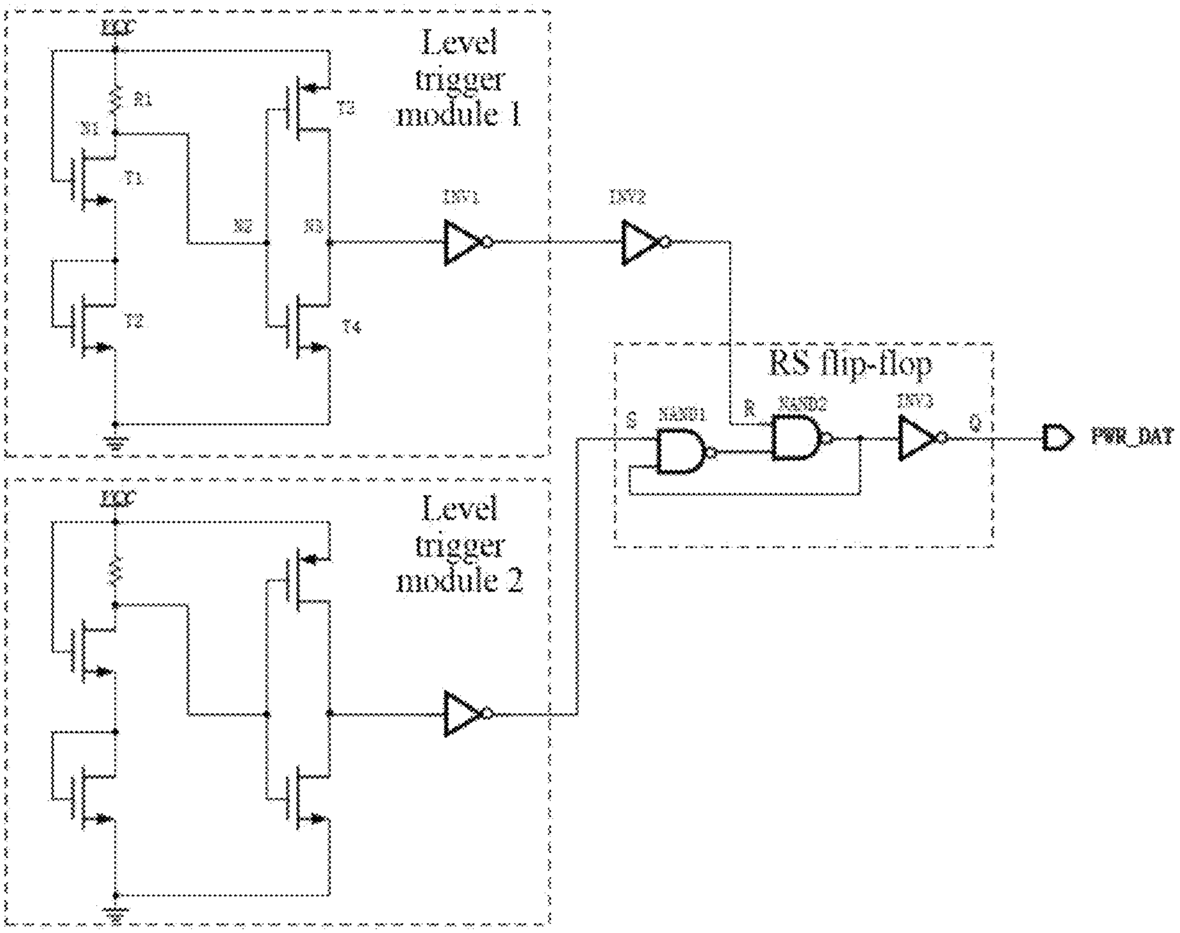
FIG. 2 is a schematic diagram of a power signal demodulation circuit.

Further, the power signal demodulation circuit is configured to generate a demodulated signal, as shown in FIG. 2, including:

a first level trigger module, configured to output a first level signal;

a second level trigger module, configured to output a second level signal;

an inverter INV2, configured to invert the first level signal to obtain a first inverted level signal; and a flip-flop, configured to obtain the demodulated signal according to the first inverted level signal and the second level signal.

An output of the first level trigger module is connected to an input terminal of the inverter INV2, and an output of the inverter INV2 is connected to a R terminal of a RS flip-flop, and is used for zero clearing of an output terminal Q of the RS flip-flop, thus enabling the output terminal Q of the RS flip-flop to output a low level. An output of the second level trigger module is connected to an S terminal of the RS flip-flop, and configured to set the output terminal Q of the RS flip-flop, thus enabling the output terminal Q of the RS flip-flop to output a high level.

Further, the first level trigger module includes a pull-up resistor R1, a transistor T1, a transistor T2, a transistor T3, a transistor T, and an inverter INV1. One terminal of the pull-up resistor R1 is connected to a power line, the other terminal of the pull-up resistor R1 is connected to a drain of the transistor T1, a gate of the transistor T1 is connected to the power line, a source of the transistor T1 is connected to gate-drain of the transistor T2 to make the transistor T2 form an equivalent diode through a diode connection method of the transistor, and a source of the transistor T2 is grounded. Gates of the transistor T3 and the transistor T4 are connected together and then connected to the drain of the transistor T1 and one terminal of the pull-up resistor T1, drains of the transistor T3 and the transistor T4 are connected, and sources of the transistor T3 and the transistor T4 are respectively connected to the power supply and the ground to form an inverter structure. An output of the inverter is connected to an input terminal of the inverter INV1, and an output terminal of the inverter INV1 serves as an output of the first level trigger module.

Internal elements and topological connection relationships of the second level trigger module are the same as those of the first level trigger module.

Therefore, output states of the two-level trigger modules are determined by the level state of the power supply VCC, in other words, the states of the two-level trigger modules are triggered by the level state of the power supply VCC.

The RS flip-flop includes an input NAND gate NAND1, an input NAND gate NAND2, and an inverter INV3.

One input terminal S of the input NAND gate NAND1 is connected to an output terminal of the second level trigger module, the other terminal of the input NAND gate NAND1 is connected to an output terminal of the input NAND gate NAND2. One input terminal R of the input NAND gate NAND2 is connected to an output terminal of the inverter INV2, the other terminal of the input NAND gate NAND2 is connected to an output terminal of the input NAND gate NAND1. An input terminal of the inverter INV3 is connected to an output terminal of the input NAND gate NAND2, and an output thereof serves as an output of the power signal demodulation circuit.

A method for data transmission by pulling a power line down to a ground line includes:

a waveform signal on a power supply VCC is demodulated to obtain a demodulated signal;

the demodulated signal is decoded according to a clock signal to obtain a decoded signal; and a control command is obtained according to the decoded signal and an address of an LED chip, where the control command is configured to control an LED.

Demodulating a waveform signal on a power supply VCC specifically includes the following sub-steps:

a first level signal and a second level signal are acquired according to a level state of the power supply VCC, the first level signal is inverted to obtain a first inverted level signal, and the demodulated signal is obtained according to the first inverted level signal and the second level signal.

A power supply level is defined as VPWR, a system ground level is defined as VGND, and a first turn-on voltage VT41, a second turn-on voltage VT42, a first trigger threshold V1 and a second trigger threshold V2 are acquired. The first turn-on voltage VT41 and the second turn-on voltage VT42 are turn-on voltages of the transistors T4 of the two-level trigger modules, respectively, and the first trigger threshold V1 and the second trigger threshold V2 are trigger thresholds of the two-level trigger modules, respectively.

As a voltage of the power supply VCC needs to be converted between VPWR and VGND at a high speed during data transmission, the power supply VCC is divided into two conditions: the voltage of the power supply VCC is converted from VGND to VPWR, and the voltage of the power supply VCC is converted from VPWR to VGND.

When the voltage of the power supply VCC is converted from VGND to VPWR, acquiring the first level signal specifically includes the following sub-steps: with the increase of the voltage of VCC, when $VT41<VCC<V1$, the first level signal is at a high level, and the first level signal is inverted to obtain the first inverted level signal at a low level, and when $V1<VCC$, the first level signal is at a low level, and the obtained first inverted level is at a high level; acquiring the second level signal specifically includes the following sub-steps: with the increase of the voltage of VCC, when $VT42<VCC<V2$, the second level signal is at a high level, and when $V2<VCC$, the second level signal is at a low level.

When the voltage of the power supply VCC is converted from VPWR to VGND, acquiring the first level signal specifically includes the following sub-steps: with the decrease of the voltage of VCC, when $V1<VCC<VPWR$, the first level signal is at a low level, and the obtained first inverted level signal is at a high level, and when $VT41<VCC<V1$, the first level signal is at a high level, and the obtained first inverted level is at a low level; and acquiring the second level signal specifically comprises the following sub-steps: with the decrease of the voltage of VCC, when $V2<VCC<VPWR$, the second level signal is at a low level, and when $VT42<VCC<V2$, the second level signal is at a high level.

When the first level signal is at a high level, the first inverted level signal is at a low level, and at this time, the demodulated signal is at a low level. When the first level signal is at a low level, the first inverted level signal is at a high level, and at this time, the level state of the demodulated signal is determined by the second level signal.

When the second level signal is at a high level, the level state of the demodulated signal is determined by the first inverted level signal. When the second level signal is at a low level and the first inverted level signal is at a high level, the demodulated signal is at a high level.

The first trigger threshold V1 is less than the second trigger threshold V2, that is, V1<V2.

When the voltage of the power supply VCC is converted from VGND to VPWR, with the increase of the voltage of VCC:

- when VCC<V1, the first level signal is at a high level, the first inverted level signal is at a low level, and at this time, the demodulated signal is at a low level;
- when V1<VCC<V2, the first level signal is at a low level, the first inverted level signal is at a high level, the second level signal is at a high level, and at this time, the demodulated signal is at a low level; and
- when VCC>V2, the first level signal is at a low level, the first inverted level signal is at a high level, the second level signal is at a low level, and at this time, the demodulated signal is at a high level.

When the voltage of the power supply VCC is converted from VPWR to VGND, with the decrease of the voltage of VCC:

- when V1<VCC<V2, the first level signal is at a low level, the first inverted level signal is at a high level, the second level signal is at a high level, and at this time, the demodulated signal is at a high level; and
- when VCC<V1, the first level signal is at a high level, the first inverted level signal is at a low level, and at this time, the demodulated signal is at a low level.

The detailed process is as follows:

By taking the first level trigger module as an example, to describe the operation principle of the level trigger module conveniently, a trigger threshold of the level trigger module is VT, and the VT can be regarded as the sum of turn-on voltages VT1 and VT2 of the transistors T1 and T2 in the level trigger module, that is, VT=VT1+VT2.

When the voltage of the power supply VCC is converted from VGND to VPWR, with the increase of the voltage of VCC, when the voltage of VCC is higher than the turn-on voltage VT4 of the transistor T4 but less than the trigger level VT, that is, VT4<VCC<VT. Due to the pull-up effect of R1, the transistor T3 is turned off, the transistor T4 is turned on, an input terminal of the INV1 is at a low level, and after single inversion, an output of the level trigger module is at a high level.

Further, when the voltage of VCC continues to rise beyond VT until reaching VPWR, i.e., VCC>VT, the transistors T1 and T2 are turned on, making gate inputs of T3 and T4 to be pulled to the relatively low level, the T3 is turned on, making the input of the inverter at a high level; and after single inversion, the output of the level trigger module is at a low level.

It needs to be emphasized that during chip design, the size of the T3 transistor needs to be greater than that of the T4 transistor, when VCC>VT, the T3 transistor has stronger driving capacity in comparison with the T4 transistor, thereby enabling an input terminal of the INV1 to be at a high level.

When the voltage of the power supply VCC is converted from VPWR to VGND, when the voltage of VCC decreases but is still higher than the trigger level VT, that is, VT<VCC<VPWR. As the transistors T1 and T2 are turned on, an output of a node N1 is at a relatively low level, and as the transistor T3 has greater driving capability than T4, an output of a node N3 is at a relatively high level. After single inversion, the output of the level trigger module remains at a low level.

Further, when the voltage of VCC continues to decrease to be lower than VT but higher than VT4, i.e., VT4<VCC<VT, the transistors T1 and T2 are turned off. Due to the pull-up effect of R1, the T3 is turned off, and the T4 is turned on, which makes the output of the N3 at a relatively high level, and after single inversion, the output of the level trigger module is at a low level.

It needs to be emphasized that to achieve the above effect, the size of the transistors and resistors need to be reasonably selected in the design process of the chip.

The operation of the above level trigger module can be summarized as one conclusion, in the process of converting between the power supply level VPWR and the ground level VGND, when the voltage of the power supply VCC is lower than the trigger level VT, the output of the level trigger module is high, and when the voltage of the power supply VCC is higher than the trigger level VT, the output of the level trigger module is low.

It should be noted that the trigger level thresholds of the first level trigger module and the second level trigger module are different.

Preferably, the trigger level of the first level trigger module is less than that of the second level trigger module. If the trigger level threshold of the first level trigger module is V1, and the trigger level threshold of the second level trigger module is V2, then V1<V2.

Further, the first level trigger module is connected to a reset terminal of the RS flip-flop after single inversion by the inverter INV2. The operation process thereof is as follows:

When the first level trigger module outputs a high level, after a single inversion, a clear terminal R of the flip-flop is at a low level, and thus an output terminal Q of the flip-flop outputs a low level. When the first level trigger module outputs a low level, after a single conversion, the clear terminal R of the flip-flop is at a high level, and thus an output state of the output terminal Q of the flip-flop is determined by an S terminal. It may be understood that when the level flip-flop 1 outputs a low level, the output of the flip-flop is not affected.

When the second level trigger module outputs a high level, a set terminal S of the flip-flop is at a high level, and the output state of the output terminal Q of the flip-flop is determined by the R terminal. It may be understood that when the level flip-flop 2 outputs a high level, the output of the flip-flop is not affected. When the second level trigger module outputs a low level, the set terminal S of the flip-flop is at a low level. In this case, the R terminal of the flip-flop is at a high level, and the output terminal Q of the flip-flop outputs a high level. It may be understood that when the level flip-flop 2 outputs a low level, and the R terminal of the flip-flop is at a high level, the flip-flop outputs a high level.

The operation principles of the level trigger module and the flip-flop are combined, the following provides a detailed description of the operation process of the power signal demodulation circuit during the conversion of the power supply VCC between the power supply level VPWR and the ground level VGND.

When the voltage of VCC is converted from VGND to VPWR, the process is as follows:

Specifically, when VCC<V1, the first level trigger module outputs a high level, which becomes a low level after a single conversion. In this case, the R terminal of the flip-flop is at a low level, making the Q terminal output a low level, and at this time, the output of the power signal demodulation circuit is at a low level.

Further, when the level of the VCC is higher than V1 and lower than V2, that is, V1<VCC<V2, the first level trigger module outputs a low level, which becomes high level after a single conversion, and at this time, the R terminal of the flip-flop is at a high level, and the output state of the flip-flop is determined by the S terminal. As VCC<V2, the second level trigger module outputs a high level, then the S terminal is at a high level, and the Q terminal of the flip-flop continues to keep at a low level state, that is, the output of the power signal demodulation signal is continuously kept at a low level.

Further, when VCC>V2, the second level trigger module outputs a low level, and the S terminal is at a low level. Apparently, the R terminal at this time is at a high level, and the output terminal Q of the flip-flop is set to be at a high level, and the output state of the power signal demodulation circuit is changed as high level.

In contrast, when the voltage of VCC is converted from VPWR to VGND, the process is as follows:

Specifically, when the level of the VCC is lower than V2 and higher than V1, that is, V1<VCC<V2, the second level trigger module outputs a high level, and the S terminal is at a high level. Apparently, the R terminal at this time is at a high level, and the output terminal Q of the flip-flop is kept at the original high level state, and at this time, the output state of the power signal demodulation circuit is maintained at a high level.

Further, when VCC<V1, the first level trigger module outputs a high level, which becomes a low level after a single inversion, and at this time, the R terminal of the flip-flop is at a low level, causing the Q terminal to output a low level. As a result, the output of the power signal demodulation circuit is converted to a low level.

In conclusion, the operation process of the power signal demodulation circuit is summarized as follows:

in the process that the voltage of the power supply VCC is converted between the power supply level VPWR and the ground level VGND, when the voltage of the power supply VCC is converted from VGND to VPWR and VCC is greater than V2, the power signal demodulation circuit outputs a high level. In contrast, when the voltage of the power supply VCC is converted from VPWR to VGND and VCC is lower than V1, the power signal demodulation circuit outputs a low level. Decoding the demodulated signal according to a clock signal specifically includes the following sub-steps:

a low level appearing in the demodulated signal is recorded as P code;

a duration of a high level in the demodulated signal is acquired and recorded as t, when t>Trst, a high level corresponding to the duration t is recorded as a reset code;

a first segment of high level which has a duration shorter than a duration of the reset code and appears after the reset code is recorded as a reference code, and the duration of a high level is recorded as Tref; when $$t < \frac{n+1}{2m} Tref,$$

a high level corresponding to the duration t is recorded as 0 code; when $$t > \frac{n+1}{2m} Tref,$$

a high level corresponding to the duration t is recorded as 1 code, where n and m are natural numbers greater than 1, and m>n;

a sequence consisting of 0 and 1 for each frame of data in the demodulated signal is acquired according to the reset code, the reference code, the 0 code and the 1 code, and taking the sequence as the decoded signal; and N data bits after the reference code in the sequence are taken as command codes, remaining data bits after the command codes are taken as data codes, where the data bits are 0 codes or 1 codes; and the control command is obtained according to the command codes and the data codes.

The chip is configured to receive decoded data to acquire the command code in the decoded data. Meanwhile, the chip intercepts the data code in the decoded data according to the own address. The command code and the data code form the control command of the chip, and the chip is configured to execute corresponding operation according to the control command.

The method further includes: the control command is converted into display data, and the display data is converted into gray duty data capable of being identified by an LED, where the gray duty data is configured to drive the LED.

Figure 4:
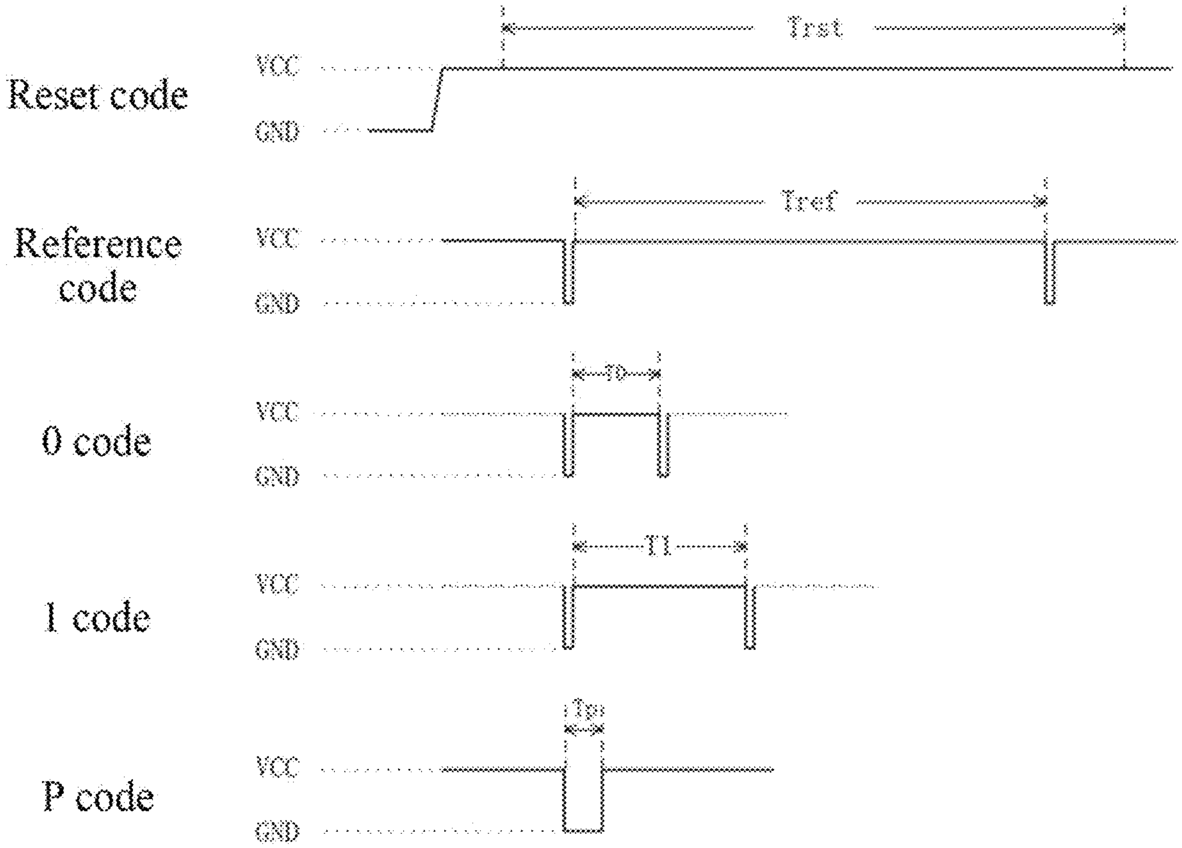
FIG. 4 is a definition diagram of a code pattern during data transmission.

The detailed process is as follows, as shown in FIG. 4:

when a low level appears in the demodulated signal for a certain period of time, a low level in this period of time is defined as P code, and a duration of low level is defined as Tp. Meanwhile, the duration of high level in the demodulated signal is defined as t.

Further, when t>Trst, the code pattern is defined as the reset code.

Further, a high level between two P codes is defined as 1 code, 0 code, and reference code. To distinguish the above code patterns, it is regulated that a high level which appears after the first P code and has a duration shorter than a duration of the reset code is defined as the reference code, and the duration is defined as Tref.

Further, to distinguish the 0 code from the 1 code, the duration of a high level of 0 code is defined as T0, and the duration of a high level of 1 code is defined as T1, and it is satisfied that T1=n*T0, Tref=m*T0, where n and m are natural numbers greater than 1, and m is greater than n. Apparently, when $$t < \frac{n+1}{2m} Tref,$$

it is defined as 0 code, and when $$t > \frac{n+1}{2m} Tref,$$

it is defined as 1 code.

Further, by defining the data code pattern, the data protocol decoding data can be configured to identify "0" or "1" of the demodulated signal, thus identifying the sequence consisting of "0" and "1" in the whole demodulated signal.

Figure 5:
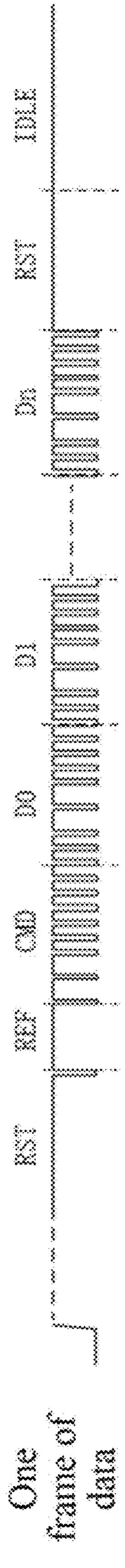
FIG. 5 is a diagram showing code pattern composition of one frame of data and timing sequence thereof.

Specifically, as shown in FIG. 5, one frame of data can be defined as consisting of basic elements such as the reset code RST, the reference code REF, the command code CMD, and data codes DO, D1 . . . . DM. The command code and the data code can be composed of N data bits, where N is a natural number not equal to 0. The data bit, i.e., is the 0 code or the 1 code. Preferably, N=8, one command code or data code includes 8 data bits. To this end, a decoding circuit the data protocol decoding circuit can complete the decoding of the demodulated signal according to the data frame structure and the definition of the data code pattern. Then, whether to execute the corresponding command or not is determined by combining the decoded data with the ID of the chip.

Further, if a corresponding command needs to be executed, the corresponding command and data are sent into the logic control circuit, and the logic control circuit is configured to generate corresponding display data through logic operation.

Further, the corresponding display data is sent to a display data control circuit, and the display data is converted into gray duty data capable of being identified by the LED.

Further, the gray duty data is sent to an LED driver circuit to drive a corresponding power tube, thus controlling the color, brightness, and mode of the LED.

In the above control process, the power supply VCC will be pulled down to the ground, and thus the circuit powered by the VCC will stop operating. However, to guarantee that the digital circuit continues to operate in a case that the power supply is turned off, a digital power hold circuit is required to maintain the required power supply.

Therefore, the method further includes:

a level state of the power supply VCC is determined, when the power supply VCC is at a high level, the power supply VCC is controlled to serve as an operation power supply to charge the digital power hold circuit; when the power supply VCC is at a low level, the digital power hold circuit is controlled to serve as the operation power supply, with a requirement to ensure that time to pull the power supply VCC down to the level of the ground line is controlled to be shorter than time required for decreasing a voltage of the digital power hold circuit to a threshold level.

Specifically, the digital power hold circuit is configured to generate a power supply required for the operation of the digital circuit. When the power supply VCC is at a high level, the digital power hold circuit is charged, and when the power supply VCC is at a low level, the digital power hold circuit supplies power to the digital circuit, and the power supply voltage decreases with the time. To ensure that the digital circuit can operate reliably, a duration of a low level state when the power supply VCC is pulled down to the ground line is ensured to be shorter than the time required for decreasing the voltage of the digital power hold circuit to a certain threshold level.

Figure 3:
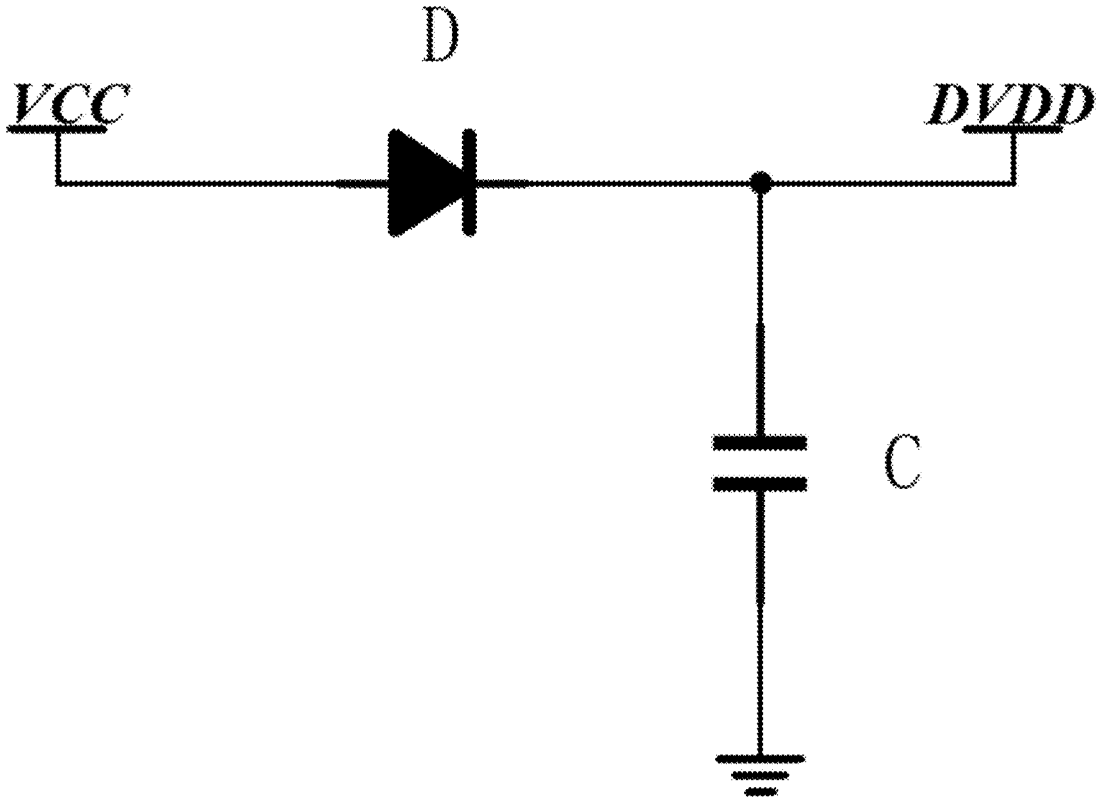
FIG. 3 is a schematic diagram of a digital power hold circuit.

Specifically, as shown in FIG. 3, the digital power hold circuit includes a diode, and an energy storage capacitor. An anode of the diode is connected to the power supply VCC, a cathode of the diode is connected to one terminal of the energy storage capacitor, and the other terminal of the energy storage capacitor is grounded. As a unidirectional conductive element, the diode is configured to charge the energy storage capacitor when the power supply VCC rises. When the power supply VCC is pulled down to the ground line, as the unidirectional conductivity of the diode can effectively prevent the energy storage capacitor from reversely discharging to the power supply VCC, thus supplying power to the digital circuit by the digital power hold circuit when the power supply VCC is pulled down to the ground.

It needs to be emphasized that the time for pulling the power supply VCC down to the ground cannot exceed the time required for discharging the energy storage capacitor to a certain level.

Alternatively, to facilitate the integration in the chip, the diode can be replaced through the following ways. An emitter and a base of an NPN transistor or a PNP transistor are shorted together and then connected to the power supply VCC, a collector is connected to the energy storage capacitor, and the other terminal of the energy storage capacitor is grounded.

Alternatively, to facilitate the integration in the chip, the diode can be replaced through another way. A gate and a source of an NMOS (N-channel metal oxide semiconductor) transistor or a PMOS (P-channel metal oxide semiconductor) transistor are shorted together and then connected to the power supply VCC, a drain is connected to the energy storage capacitor, and the other terminal of the energy storage capacitor is grounded.

Alternatively, to facilitate the integration in the chip, the energy storage capacitor can be replaced through another way. A drain and a source of the NMOS transistor are shorted and then connected to the ground, and a gate is connected to the cathode of the diode to form a MOS capacitor.

The present disclosure further provides an LED driver circuit, the driving control of the LED can be implemented according to an LED brightness duty ratio signal.

Specifically, multiple LED driving ports are integrated in the LED driver circuit, which can be connected to different colors of LEDs. The circuit is configured to accurately control the color change and brightness of the LED by receiving a signal from the display data control circuit.

Specifically, the display data control circuit is firstly configured to analyze the brightness and enabling commands of the ports of the chip in the decoded command, and then to convert these commands into high and low levels required for driving the LED, as well as driving current signals. In this system, a high level signal is set to activate the LED (that is, the LED is on), while the low-level signal is configured to turn off the LED. The on-of state of the LED on each port can be flexibly controlled by regulating a state of each driving port.

Further, the brightness regulation of the LED is implemented by adjusting the proportion of a high level signal of the driving port in one cycle: when a high level signal occupies a relatively high proportion, the LED displays high brightness; otherwise, the brightness is lower. In addition, the brightness of the LED can be finely regulated by directly controlling the current on the driving port, and such a regulation process is determined by the setting of current parameters of an internal command of the chip.

The above is only the better embodiment of the present disclosure, and is not intended to limit the present disclosure in any form. Any simple modifications, equivalent changes or adaptations made to the above embodiments based on the technical essence of the present disclosure shall fall within the scope of the technical solutions of the present disclosure.

What is claimed is:

1. A method for data transmission by pulling a power line down to a ground line, comprising the following steps:

demodulating a waveform signal on a power supply VCC to obtain a demodulated signal;

decoding the demodulated signal according to a clock signal to obtain a decoded signal; and obtaining a control command according to the decoded signal and an address of an LED (light-emitting diode) chip, wherein the control command is configured to control an LED;

wherein demodulating a waveform signal on a power supply VCC comprises the following sub-steps:

acquiring a first level signal and a second level signal according to a level state of the power supply VCC, inverting the first level signal to obtain a first inverted level signal, and obtaining the demodulated signal according to the first inverted level signal and the second level signal;

wherein the method further comprises: defining a power supply level as VPWR, and a system ground level as VGND, and acquiring a first turn-on voltage VT41, a second turn-on voltage VT42, a first trigger threshold V1 and a second trigger threshold V2; and dividing the power supply VCC into two conditions: converting a voltage of the power supply VCC from VGND to VPWR, and the voltage of the power supply VCC from VPWR to VGND;

when the voltage of the power supply VCC is converted from VGND to VPWR, acquiring the first level signal specifically comprises the following sub-steps: with the increase of VCC voltage, when VT41<VCC<V1, obtaining the first level signal at a high level, and inverting the first level signal to obtain the first inverted level signal at a low level; when V1<VCC, obtaining the first level signal at a low level, and inverting the first level signal to obtain the first inverted level at a high level; and acquiring the second level signal specifically comprises the following sub-steps: with the increase of the voltage of VCC, when VT42<VCC<V2, obtaining the second level signal at a high level, and when V2<VCC, obtaining the second level signal at a low level;

when the voltage of the power supply VCC is converted from VPWR to VGND, acquiring the first level signal specifically comprises the following sub-steps: with the decrease of the voltage of VCC, when V1<VCC<VPWR, obtaining the first level signal at a low level, and inverting the first level signal to obtain the first inverted level signal at a high level; when VT41<VCC<V1, obtaining the first level signal at a high level, and inverting the first level signal to obtain the first inverted level at a low level; and acquiring the second level signal specifically comprises the following sub-steps: with the decrease of the voltage of VCC, when V2<VCC<VPWR, obtaining the second level signal at a low level, and when VT42<VCC<V2, obtaining the second level signal at a high level;

when the first level signal is at a high level, the first inverted level signal is at a low level, and the demodulated signal is at a low level at the moment; when the first level signal is at a low level, the first inverted level signal is at a high level, and a level state of the demodulated signal is determined by the second level signal; and when the second level signal is at a high level, the level state of the demodulated signal is determined by the first inverted level signal; and when the second level signal is at a low level and the first inverted level signal is at a high level, the demodulated signal is at a high level at the moment.

2. The method for data transmission by pulling a power line down to a ground line according to claim 1, wherein the first trigger threshold V1 is less than the second trigger threshold V2, that is, V1<V2:

when the voltage of the power supply VCC is converted from VGND to VPWR, with the increase of the voltage of VCC:

when VCC<V1, the first level signal is at a high level, the first inverted level signal is at a low level, and the demodulated signal is at a low level at the moment;

when V1<VCC<V2, the first level signal is at a low level, the first inverted level signal is at a high level, the second level signal is at a high level, and the demodulated signal is at a low level at the moment;

when VCC>V2, the first level signal is at a low level, the first inverted level signal is at a high level, the second level signal is at a low level, and the demodulated signal is at a high level at the moment;

when the voltage of the power supply VCC is converted from VPWR to VGND, with the decrease of the voltage of VCC:

when V1<VCC<V2, the first level signal is at a low level, the first inverted level signal is at a high level, the second level signal is at a high level, and the demodulated signal is at a high level at the moment; and when VCC<V1, the first level signal is at a high level, the first inverted level signal is at a low level, and the demodulated signal is at a low level at the moment.

3. The method for data transmission by pulling a power line down to a ground line according to claim 2, wherein decoding the demodulated according to a clock signal specifically comprises the following sub-steps:

recording a low level appearing in the demodulated signal as P code;

acquiring and recording a duration of a high level in the demodulated signal as t, when t>Trst, recording a high level corresponding to the duration t as a reset code;

recording a first segment of high level which has a duration shorter than a duration of the reset code and appears after the reset code as a reference code, and recording the duration of a high level as Tref; when $$t < \frac{n+1}{2m} Tref,$$

recording a high level corresponding to the duration t as 0 code; when $$t > \frac{n+1}{2m} Tref,$$

recording a high level corresponding to the duration t as 1 code, wherein n and m are natural numbers greater than 1, and m>n;

acquiring a sequence consisting of 0 and 1 for each frame of data in the demodulated signal according to the reset code, the reference code, the 0 code and the 1 code, and taking the sequence as the decoded signal; and taking N data bits after the reference code in the sequence as command codes, taking remaining data bits after the command codes as data codes, wherein the data bits are 0 codes or 1 codes; and obtaining the control command according to the command codes and the data codes.

4. The method for data transmission by pulling a power line down to a ground line according to claim 1, further comprising:

determining a level state of the power supply VCC, when the power supply VCC is at a high level, controlling the power supply VCC to serve as an operation power supply to charge a digital power hold circuit; when the power supply VCC is at a low level, controlling the digital power hold circuit to serve as the operation power supply, with a requirement to ensure that time to pull the power supply VCC down to the level of the ground line is controlled to be shorter than time required for decreasing a voltage of the digital power hold circuit to a threshold level.

5. A circuit for data transmission by pulling a power line down to a ground line, wherein the circuit is applied to the method for data transmission by pulling a power line down to a ground line according to claim 1, comprising:

a power signal demodulation circuit, configured to demodulate a waveform signal on a power supply VCC and output a demodulated signal, wherein the demodulated signal is sent to a data protocol decoding circuit;

a bandgap reference circuit, configured to generate a reference voltage, wherein the reference voltage is sent to a voltage regulator circuit;

a digital power hold circuit, configured to generate a power supply required by a digital circuit for operation, charge the digital power hold circuit when a power supply VCC is at a high level, and supply power to a digital circuit when the power supply VCC is at a low level;

a chip ID storage circuit, configured to store an address of an LED chip of an LED driver circuit, and send the address to the data protocol decoding circuit for use;

a voltage regulator circuit, configured to convert a voltage of a power supply into a regulated voltage for internal use, and supply the regulated voltage to other circuits except a digital power supply;

an oscillator unit, configured to generate a clock signal to provide clock beats for the whole digital circuit operation;

a data protocol decoding circuit, configured to decode the demodulated signal according to the clock signal and the address of the LED chip to acquire a control command of an LED control system;

a logic control circuit, configured to generate corresponding display data according to a decoding command; and a digital data control circuit, configured to convert the display data into gray duty data for controlling brightness of an LED lamp, wherein the gray duty data is sent to the LED driver circuit for driving an LED.

6. The circuit for data transmission by pulling a power line down to a ground line according to claim 5, wherein the power signal demodulation circuit comprises:

a first level trigger module, configured to output a first level signal;

a second level trigger module, configured to output a second level signal;

an inverter INV2, configured to invert the first level signal to obtain a first inverted level signal; and a flip-flop, configured to obtain a demodulated signal according to the first inverted level signal and the second level signal;

wherein an output of the first level trigger module is connected to an input terminal of the inverter INV2, and an output of the inverter INV2 is connected to a R terminal of a RS flip-flop, and is used for zero clearing of an output terminal Q of the RS flip-flop, thus enabling the output terminal Q of the RS flip-flop to output a low level; an output of the second level trigger module is connected to an S terminal of the RS flip-flop, and configured to set the output terminal Q of the RS flip-flop, thus enabling the output terminal Q of the RS flip-flop to output a high level.

7. The circuit for data transmission by pulling a power line down to a ground line according to claim 6, wherein the first level trigger module comprises a pull-up resistor R1, a transistor T1, a transistor T2, a transistor T3, a transistor T4, and an inverter INV1;

one terminal of the pull-up resistor R1 is connected to a power line, the other terminal of the pull-up resistor R1 is connected to a drain of the transistor T1, a gate of the transistor T1 is connected to the power line, a source of the transistor T1 is connected to gate-drain of the transistor T2 to make the transistor T2 form an equivalent diode through a diode connection method of the transistor, and a source of the transistor T2 is grounded; gates of the transistor T3 and the transistor T4 are connected together and then connected to the drain of the transistor T1 and one terminal of the pull-up resistor T1, drains of the transistor T3 and the transistor T4 are connected, and sources of the transistor T3 and the transistor T4 are respectively connected to the power supply and the ground to form an inverter structure; and an output of the inverter is connected to an input terminal of the inverter INV1, and an output terminal of the inverter INV1 serves as an output of the first level trigger module;

internal elements and topological connection relationships of the second level trigger module are the same as those of the first level trigger module.

8. The data transmission circuit by pulling a power line down to a ground line according to claim 7, wherein the RS flip-flop comprises an input NAND gate NAND1, an input NAND gate NAND2, and an inverter INV3;

one input terminal S of the input NAND gate NAND1 is connected to an output terminal of the second level trigger module, and the other terminal of the input NAND gate NAND1 is connected to an output terminal of the input NAND gate NAND2;

one input terminal R of the input NAND gate NAND2 is connected to an output terminal of the inverter INV2, the other terminal of the input NAND gate NAND2 is connected to an output terminal of the input NAND gate NAND1; an input terminal of the inverter INV3 is connected to an output terminal of the input NAND gate NAND2, and an output thereof serves as an output of the power signal demodulation circuit.

* * * * *